US008118660B2

(12) United States Patent
Pace

(10) Patent No.: US 8,118,660 B2
(45) Date of Patent: Feb. 21, 2012

(54) SYSTEM AND METHOD FOR CONTROLLING THE NUMBER OF PLAYS OF AN ELECTRONIC GAME

(75) Inventor: Michael R. Pace, Alpharetta, GA (US)

(73) Assignees: Michael R. Pace; Pace-O-Matic, Inc.

( * ) Notice: Subject to any disclaimer, the term of this patent is extended or adjusted under 35 U.S.C. 154(b) by 964 days.

(21) Appl. No.: 11/430,770

(22) Filed: May 9, 2006

(65) Prior Publication Data

US 2007/0232385 A1 Oct. 4, 2007

Related U.S. Application Data

(60) Provisional application No. 60/788,363, filed on Mar. 31, 2006.

(51) Int. Cl.
*A63F 13/00* (2006.01)

(52) U.S. Cl. ............................... 463/20; 463/22; 463/16

(58) Field of Classification Search ..................... 463/20
See application file for complete search history.

(56) References Cited

U.S. PATENT DOCUMENTS 5,277,424 A * 1/1994 Wilms ............................ 463/12
6,604,740 B1 * 8/2003 Singer et al. .................. 273/292
6,648,758 B2 * 11/2003 Bennett et al. .................. 463/20
7,040,985 B2 * 5/2006 Vancura .......................... 463/20

OTHER PUBLICATIONS

Turner, "Tic-Tac-Fruit: An Analysis," Nov. 15, 2004.
Farley, "Report on the Review and Analysis of the Tic-Tac-Fruit Game," Letter to Kurt O. Gearhiser, Esq., Mar. 7, 2005.

* cited by examiner

*Primary Examiner* — Dmitry Suhol
*Assistant Examiner* — Andrew Kim
(74) *Attorney, Agent, or Firm* — Womble Carlyle Sandridge & Rice, LLP

(57) ABSTRACT

A system and method for controlling the number of plays of an electronic game based on the different denominations at which the electronic game can be played. A game field is constructed having a plurality of elements on a game display wherein each element is filled by a game symbol from a plurality of available game symbols, wherein the game symbols for each element are automatically determined such that there is no winning combination without player interaction. The field of game symbols is presented to the player for selection of a field element wherein such player selection turns the symbol displayed in the field element into a wild symbol. The player's selection of the field element for the wild symbol location is received by the game software which determines each winning combination of symbols that is formed by such wild symbol location selection. Each winning combination of symbols on the field of game symbols is displayed to the player. The total number of plays of the game remaining is dynamically determined based on an action taken by the player prior to selecting the field element location for the wild symbol.

30 Claims, 8 Drawing Sheets

| 300 | 302 | 304 | 306 | 308 | 310 | 312 |
|---|---|---|---|---|---|---|
| PLAY DENOMINATION | PLAYER RETURN | OPERATOR PROFIT PER PLAY | TOTAL PLAYS | GAME PROVIDER PROFIT | GAME PROVIDER CHARGE PER PLAY | OPERATOR PROFIT PER FILL |
| 0.25 | 85% | $0.0375 | 200K | 15.6% | $0.00585 | $7,500.00 |
| 0.50 | 87% | $0.0650 | 140K | 12.9% | $0.00836 | $9,100.00 |
| 0.75 | 89% | $0.0825 | 130K | 10.9% | $0.009 | $10,725.00 |
| 1.00 | 90% | $0.1000 | 120K | 9.75% | $0.00975 | $12,000.00 |
| 2.00 | 92% | $0.1600 | 85K | 8.60% | $0.01376 | $13,600.00 |
| 3.00 | 93% | $0.2100 | 75K | 7.43% | $0.0156 | $15,750.00 |
| 4.00 | 94% | $0.2400 | 75K | 6.50% | $0.0156 | $18,000.00 |
| 5.00 | 95% | $0.2500 | 75K | 6.24% | $0.0156 | $18,750.00 |

FIG. 3

| CRD | VALUE | COUNT | PLAYS | RATE USE% | LEFT |
|---|---|---|---|---|---|
| 1 | $0.25 | 200,000 | 0 | 0.0000% | 199,982 |
| 2 | $0.50 | 140,000 | 2 | 0.0014% | 139,988 |
| 3 | $0.75 | 130,000 | 0 | 0.0000% | 129,988 |
| 4 | $1.00 | 120,000 | 1 | 0.0008% | 119,989 |
| 8 | $2.00 | 85,000 | 0 | 0.0000% | 84,992 |
| 12 | $3.00 | 75,000 | 0 | 0.0000% | 74,993 |
| 16 | $4.00 | 75,000 | 5 | 0.0067% | 74,993 |
| 20 | $5.00 | 75,000 | 0 | 0.0000% | 74,993 |
| COLUMN TOTALS | | | 8 | 0.0089% | |

FIG. 4

500 502 504 506 508

| ITEM | PLAY VALUE | MILLICENT CHARGE | BANK USE COUNTER | LINE ITEM TOTAL |
|---|---|---|---|---|
| 1 | OTHER | 0 | 0 | $0.00 |
| 2 | 0.00 | 0 | 0 | $0.00 |
| 3 | $0.25 | 915 | 5 | $0.04 |
| 4 | $0.50 | 1740 | 0 | $0.00 |
| 5 | $0.75 | 2475 | 0 | $0.00 |
| 6 | $1.00 | 3120 | 5 | $0.15 |
| 7 | $1.25 | 3675 | 3 | $0.11 |
| 8 | $1.50 | 4140 | 0 | $0.00 |
| 9 | $1.75 | 4515 | 0 | $0.00 |
| 10 | $2.00 | 4800 | 2 | $0.09 |
| COLUMN TOTALS | | | 15 | $0.39 |

FIG. 5

SYSTEM AND METHOD FOR CONTROLLING THE NUMBER OF PLAYS OF AN ELECTRONIC GAME

CROSS-REFERENCE TO RELATED APPLICATION

The present patent application is a formalization of a previously filed, provisional patent application entitled "System and Method for Controlling Plays of an Electronic Game," filed on Mar. 31, 2006 as U.S. patent application Ser. No. 60/788,363 by the inventor named in this patent application. This patent application claims the benefit of the filing date of the cited provisional patent application according to the statutes and rules governing provisional patent applications, particularly 35 USC §119(e)(1) and 37 CFR §§1.78(a)(4) and (a)(5). The specification and drawings of the provisional patent application are specifically incorporated herein by reference.

BACKGROUND OF THE INVENTION

The present invention is related generally to amusement and entertainment electronic gaming and, more particularly, to a method and system for controlling the number of plays that are available to players of an amusement or entertainment electronic game as play progresses.

Amusement and entertainment type electronic games have become very popular with the public and, as their popularity has increased, several states have legalized certain types of gaming but under heavy regulation. For example, the state of Ohio generally prohibits, pursuant to statutes, gambling and the use of any gambling devices. However, skill-based amusement machines are permitted. To qualify as a skill-based amusement machine in Ohio, the outcome of play during the game must be controlled by the person playing the game and not by predetermined odds or random chance controlled by the machine. Some chance can be part of a skill-based amusement game, but skill must be the predominant feature. The play on the machine must involve a task, game, play, contest, competition or tournament in which the player actively participates.

On a Federal level, Congress enacted the Indian Gaming Regulatory Act (IGRA) in 1988 to regulate gaming operations run by Indian tribes on Indian land. The IGRA established three classes of games with a different regulatory scheme for each. Class I gaming is defined as traditional Indian gaming and social gaming for minimal prizes. Regulatory authority over class I gaming is vested exclusively in tribal governments.

Class II gaming is defined as the game of chance commonly known as bingo (whether or not electronic, computer, or other technological aids are used in connection therewith) and if played in the same location as the bingo, pull tabs, punch board, tip jars, instant bingo, and other games similar to bingo. Class II gaming also includes non-banked card games, i.e., games that are played exclusively against other players rather than against the house or a player acting as a bank. The IGRA specifically excludes slot machines or electronic facsimiles of any game of chance from the definition of class II games. Tribes retain their authority to conduct, license, and regulate class II gaming as long as the state in which the Tribe is located permits such gaming for any purpose and the Tribal government adopts a gaming ordinance approved by the National Indian Gaming Commission (NIGC). Tribal governments are responsible for regulating class II gaming with NIGC oversight.

Class III games include any games that are not class I or class II such as slots, video poker, video blackjack, video Keno, etc. that are usually offered in state-regulated casinos.

SUMMARY OF THE INVENTION

The present invention is directed to a system and method for controlling the number of plays of an electronic game based on the different denominations at which the electronic game can be played. The invention provides a finite structure having a variable number of plays for each possible denomination of play. The electronic game service provider charges a flat licensing fee for each reload of virtual game cartridges. However, instead of a having a fixed number of plays available per load of the virtual cartridges, the number of plays available are based on the denominations available for player selection and are modified during operation of the game plays based on the actual denominations used by the players on the electronic game console.

In one aspect of the invention, a method is provided for controlling the number of available plays of an electronic game. A game field is constructed having a plurality of elements on a game display wherein each element is filled by a game symbol from a plurality of available game symbols, wherein the game symbols for each element are automatically determined such that there is no winning combination without player interaction. The field of game symbols is presented to the player for selection of a field element wherein such player selection turns the symbol displayed in the field element into a wild symbol. The player's selection of the field element for the wild symbol location is received by the game software which determines each winning combination of symbols that is formed by such wild symbol location selection. Each winning combination of symbols on the field of game symbols is displayed to the player. The total number of plays of the game remaining is dynamically determined based on an action taken by the player prior to selecting the field element location for the wild symbol.

In another aspect of the invention, a computer program product is provided for controlling the number of available plays of an electronic game. The computer program product comprises a computer readable medium having computer readable code embedded therein. The computer readable medium includes program instructions that construct a field having a plurality of elements for a game display wherein each element is filled by a game symbol from a plurality of available game symbols, wherein the game symbols for each element are automatically determined such that there is no winning combination without player interaction; program instructions that present the field of game symbols to the player for selection of a field element wherein such player selection turns the symbol displayed in the field element into a wild symbol; program instructions that receive the player's selection of the field element as a location for the wild symbol and determine each winning combination of symbols that is formed by such selection; program instructions that display each winning combination of symbols on the field of game symbols; and program instructions that dynamically determine the total number of plays of the game remaining based on an action taken by the player prior to selecting the field element location for the wild symbol.

In another aspect of the invention, a system is provided for controlling the number of available plays of an electronic game. A game processor generates an electronic game display on a game terminal with a plurality of options selectable by a player. The game processor includes a component for constructing a field having a plurality of elements for a game display wherein each element is filled by a game symbol from a plurality of available game symbols, wherein the game symbols for each element are automatically determined such that there is no winning combination without player interaction; a component for presenting the field of game symbols to the player for selection of a field element wherein such player selection turns the symbol displayed in the field element into a wild symbol; a component for receiving the player's selection of the field element as a location for the wild symbol and determining each winning combination of symbols that is formed by such selection; a component for displaying each winning combination of symbols on the field of game symbols; a component that reads a level of play selected by the player; and a component for dynamically determining the total number of plays of the game remaining based on an action taken by the player prior to selecting the field element location for the wild symbol.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 3 illustrates an exemplary payout scheme for varying denominations of play in an exemplary embodiment.

FIG. 4 illustrates game terminal status receipts available to the operator of electronic games in the "plays level" exemplary embodiment.

FIG. 5 illustrates game terminal status receipts available to the operator of electronic games in a "license timer" exemplary embodiment.

DETAILED DESCRIPTION OF THE INVENTION

Figure 1A:
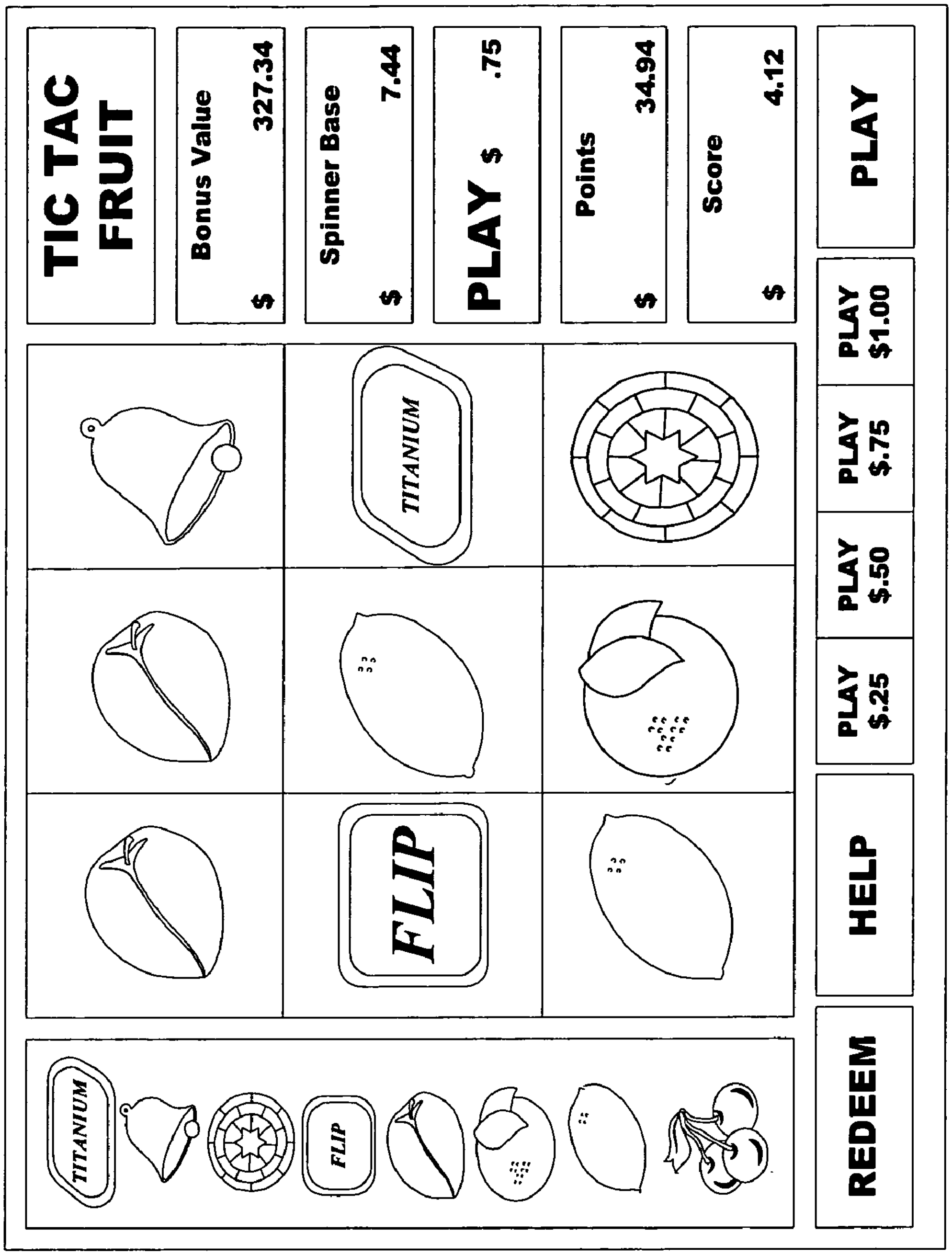
FIGS. 1A-1B illustrate electronic game displays for a skill-based game in which the present invention can be implemented.

The following description of the invention is provided as an enabling teaching of the invention and its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

The present invention will be described in the context of the Tic-Tac Fruit electronic skill-based amusement game developed and licensed by Pace-O-Matic, Inc. Tic-Tac Fruit is a game loosely derived from tic-tac-toe that uses player skill to solve a puzzle. The similarity to tic-tac-toe extends from the use of a field or grid of nine spots or tiles arranged in a three by three array. On each play of the electronic game, the game software program constructs a puzzle or task for the player to solve. The electronic game always incorporates at least one correct solution and sometimes generates alternative solutions that may not provide the same prize as the best solution.

The Tic-Tac-Fruit electronic game is a single player game. The player is presented a field completely filled with apparently random symbols selected from a set of nine symbols that includes a "wild" symbol. The "wild" symbol can represent any of the other symbols in the set of game symbols. The "wild" symbol is identical in concept to the "wild card" in card games. The player chooses the displayed symbol in the field to become the "wild" symbol and the symbol(s) that it represents becomes the symbol necessary to complete a winning line(s). The game constructs the field so that the initial field does not place three of the same symbols in a row wherein a row is interpreted as being oriented horizontally, vertically, or diagonally. The field constructed does not include the "wild" symbol. With a three by three field, there are eight possible lines: three horizontal lines, three vertical lines, and two diagonal lines. The player gets a choice of replacing one of the initial nine spots or tiles with the "wild" symbol. The game's construction of the field guarantees that at least one line may be formed by placing the wild symbol selection in the proper spot. On average, two lines may be formed if the optimal spot for the "wild" symbol is selected. However, there is always the possibility that at least one line can be formed.

The player's skills enters into play as the player is given a short period of time in which to choose the "wild" symbol location. Since some symbols are more valuable than others and some locations for the wild symbol may complete multiple lines, a player must quickly examine all nine locations and determine the optimal location for the wild symbol. Once the player selects a location, the game converts the symbol displayed in the element to a wild symbol and examines the field of elements for complete lines and awards points accordingly.

Since there are eight symbols and nine spots on the field, the total number of combinations is approximately 134 million. However, since a field cannot have any initial complete lines, the total number of initial combinations is reduced to approximately 118 million. Valid fields are determined by using an embedded computer processor to iterate through and test each combination to determine if it has any complete lines. If any lines are complete, the combination is not counted or used. The game software determines all of the initial "no-line" fields and tests each of these for potential winners where all fields that can potentially complete a line are counted. Since there are over 100 million compliant field combinations, the player must examine each lineup and symbol values to determine the best location for selecting the wild symbol on the field displayed.

The Tic-Tac-Fruit electronic game does not pick random fields until testing indicates that one is acceptable. Instead, the field is constructed to meet certain criteria. The steps involved in constructing a field in this electronic game are as follows:

1. chose the number of winning lines (i.e., 1, 2, 3, 4);
2. chose the orientation of each of the winning lines (i.e., horizontal, vertical, or diagonal);

3. chose the symbols for each of the lines (i.e., cherries, plums, bells, etc.);
4. fill in empty spots with random symbols; and
5. test the complete field for compliance with the goals set by steps 1 and 3 and repeat the construction process if compliance fails.

Figure 1B:
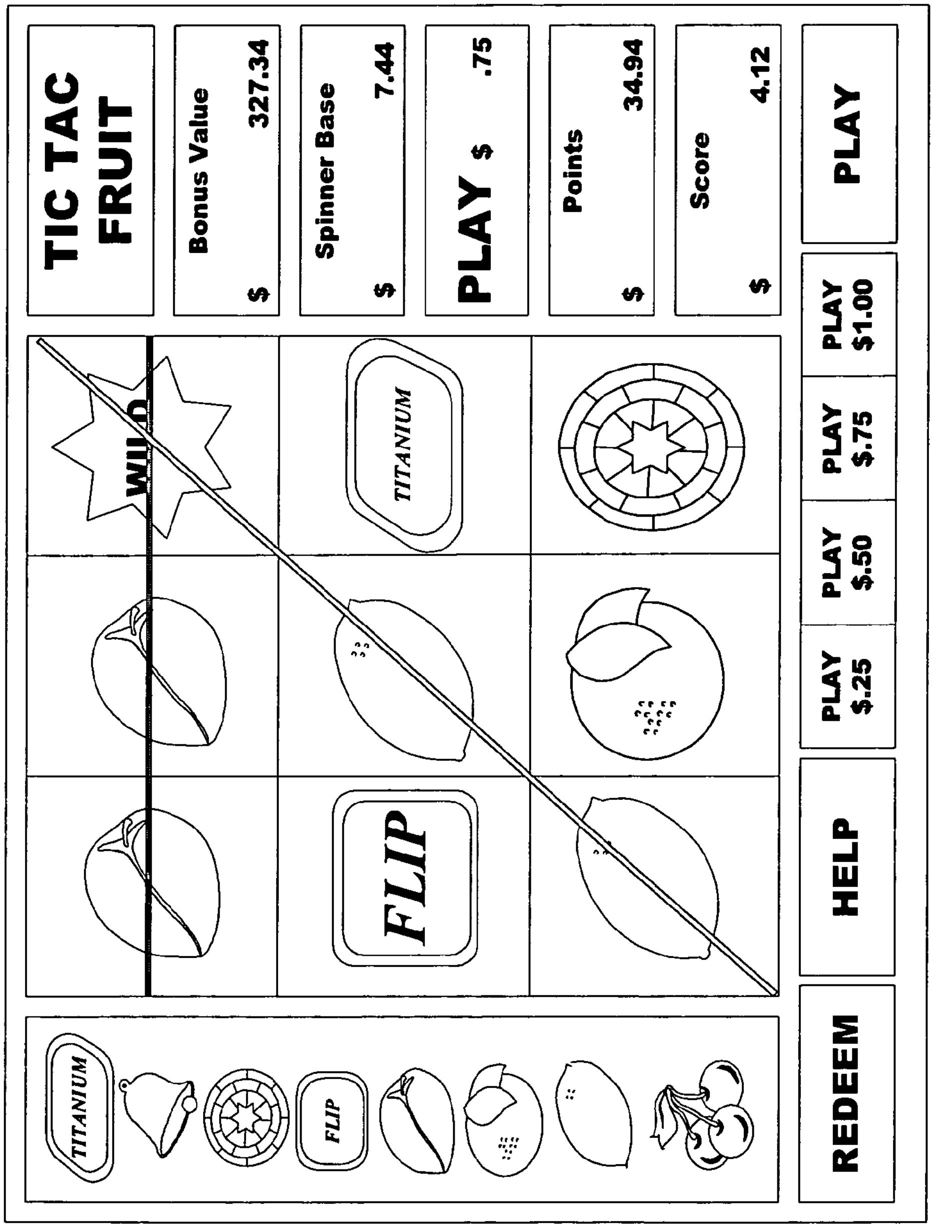

One variation of the Tic-Tac-Fruit electronic game presents a game theme that is based primarily on fruit symbols. There are eight symbols and therefore eight different winning combinations. An exemplary touch screen display for this game is illustrated in FIG. 1A. The different symbols that can be displayed are shown in the left column of the display. The player selects a denomination for the next play of the game from among the denominations available on the bottom of the display. In this example, the player has selected $0.75. The game grid depicted does not show any complete lines. Once the player selects the "Play" icon, he must decide which element on the display grid to select as the location of the wild symbol. As illustrated in FIG. 1B, the player selected the space in the upper right corner of the display grid which resulted in the simultaneous completion of two lines, i.e., a horizontal line and a diagonal line.

An exemplary award schedule for this version of the Tic-Tac-Fruit electronic game is provided in Table 1. The column headings represent denominations of play. In other words, the column heading represent the amount that the player can select for each play. The higher the denomination selected, the greater the potential winnings for each of the winning combinations. For example, if the player selects fifty cents as the denomination for the next play of the electronic game, and completes a line with three titanium symbols, he will win the equivalent of $250.00 in points. Had he successfully played the same game with a $4.00 denomination of play, his winnings would have been the equivalent of $2,000.00 in points. Likewise, if the player had selected a denomination of $2.00 and made a location selection for the wild symbol that simultaneously completed a line of three bells and a line of three plums, his winnings would have been the equivalent of $14.00 in points, $10.00 for the line of three bells and $4.00 for the line of three plums. The prizes marked with an asterisk are progressive value prizes. The value awarded for these prizes will increase with every game played.

TABLE 1

Tic-Tac-Fruit (Classic)

| | Denomination | | | |
|---|---|---|---|---|
| Symbol | 50¢ | $1.00 | $2.00 | $4.00 |
| 3 Titanium | $250* | $500* | $1,000* | $2,000* |
| 3 Spinner | 80¢ | $1.60* | $3.20* | $6.40* |
| 3 Flip | * | * | * | * |
| 3 Bell | $2.50 | $3 | $10 | $20 |
| 3 Plum | $1 | $2 | $4 | $8 |
| 3 Orange | 8¢ | 16¢ | 32¢ | 64¢ |
| 3 Lemon | 4¢ | 8¢ | 16¢ | 32¢ |
| 3 Cherry | 2¢ | 4¢ | 8¢ | 16¢ |

In game operation, a player inserts money into the Tic-Tac-Fruit electronic game device through a bill acceptor located on the front of the electronic game cabinet or console beneath the button panel. The bill acceptor accepts U.S. notes of varying denominations. Bills inserted are displayed on the video screen as points available for game play. The player selects the denomination of play by touching the appropriate icon for the price of game play. A player may change the desired denomination at any time prior to engaging in game play.

Game play begins with the player touching the "Play" icon on the video screen or pressing the "Play/Credit" button on the cabinet exterior. The video screen presents nine symbols in a three by three array to the player as discussed above. The object of the game is for the player to recognize the most rewarding game outcome and to select the appropriate element (i.e., filed location) to change from the displayed symbol to a wild symbol in order to obtain the most valuable prize available for the displayed field.

As described above, the initial nine symbols displayed will not present an automatic winning combination. The player must engage in the selection of the field element to be replaced with a "wild" symbol in order to obtain a winning game outcome. The player has a finite length of time in which to select the appropriate field element to replace with the "wild" symbol. Failure to select a field element location for the wild symbol in the allotted time will result in a losing game outcome. In such an instance, the amount that would have been won is revealed to the player and placed into the "bonus pool" that will be won by the player successfully obtaining the top prize. Likewise, if a player selects a field element to replace with a wild symbol that does not obtain a winning outcome, or the best possible winning outcome, the amount that was not won is added to the bonus pool. In the case of the player not obtaining the best possible outcome, the difference between the prize won and the best possible prize is added to the bonus pool.

Essentially, the Tic-Tac-Fruit electronic game presents a task whereby the player must select the appropriate field element to replace with a wild symbol in an effort to obtain the highest value game outcome offered by the device. The prize is determined by a random selection from a finite pool of available prizes. The device selects the quantity of lines that will present a winning outcome. Prizes may be presented on one, two, three, or four lines in a single game play. The device selects the level of prize(s) to be awarded. A software algorithm assesses the arrangement of the prize(s) to be offered to assure that no other, more valuable prizes will inadvertently be presented. The key symbol needed to obtain the highest value prize is replaced with a non-winning symbol prior to display to the player.

The player may redeem accumulated credits after game play. Redemption of the credits is accomplished simply by pressing the "Ticket" button or touching the "Redeem" icon on the video screen. All accumulated credits will be redeemed as a cash voucher on a printed ticket. The printed ticket can be presented to a redemption counter within the venue for cash payment.

The Tic-Tac-Fruit game possesses a finite number of plays. The game is configured with electronic cartridges that contain a finite pool of game plays based upon eight different levels of winning prize values. The electronic cartridges are not accessible to the operator of the machine and cannot be changed. When the current allotment of finite game plays in one cartridge is depleted, the next cartridge is automatically selected by the device. When all of the electronic cartridges are depleted, the device will become disabled with a message stating "out of plays" on the lower center of the video screen. The device operator must purchase additional pools of game plays, which will be enabled with the correct entry of an eight digit pass code provided by the electronic game provider. Configuration of game play for a specific machine can only be done by software programming.

The quantity of game plays is also game theme specific, i.e., it varies based on the particular version of the Tic-Tac-Fruit electronic game that is placed in a venue. For the one described herein, there are three electronic cartridges provided with the game, with thirty-thousand plays per electronic cartridge for a total number of ninety thousand game play. The particular number of game plays for each version of the Tic-Tac-Fruit game are purchased by a device operator. The operator pays a flat licensing fee in order to obtain an eight digit pass code that must be correctly entered in order to enable the appropriate quantity of game plays for the various game themes.

Each purchase level of each game theme is merely a multiple of a lowest game purchase level. Therefore, all game outcomes are derived from the same finite pool of game outcomes, regardless of purchase amount. Each time the player engages play, an outcome is selected at random from the finite pool of game outcomes. The manner in which the player plays the game determines whether the player will receive the winnings or if the winnings will go into the bonus pool, which will be awarded to the next player successfully obtaining the top prize.

By using the concept of a virtual cartridge to reload an electronic game console for plays, the electronic game service provider has been limited to a licensing fee for the game software which permits a finite number of plays, i.e., 30,000 per virtual cartridge, 90,000 total plays in the case of the Tic-Tac-Fruit game used as an example herein. The problem with this system is that the operator of the game receives 90,000 plays regardless of the denominations selected for play by the game players. The electronic game in an exemplary embodiment provides the player with four different play levels, e.g., $0.50, $1.00, $2.00 and $4.00. The operator can have the game console provide other denominations of play instead. If a player played the electronic game at the $0.50 level and uses all 90,000 plays available, the operator is going to make far less in profit than if the players had selected the $4.00 level for all plays. From the electronic game service provider's perspective charging a flat fee for the virtual cartridges, if all the games are played at the lowest denomination, the game operator may not make sufficient profit to make keeping the game console installed at the operator's location worthwhile. On the other hand, the flat fee charged may result in too small a profit for the electronic game service provider. Under current laws, the game provider does not have the option of charging the operator a fixed percentage of his profits for leasing the electronic game and software. An additional problem with playing an electronic game with a finite structure (i.e., fixed number of plays) having a "jackpot" for each virtual cartridge is that the operator has access to information on the number of plays still remaining and could take advantage of this information to play the remaining games at the highest denomination to win the jackpot amount.

The present invention solves this problem by having a finite structure for each denomination of play. The electronic game service provider still charges a flat licensing fee for each reload of the virtual cartridges. However, instead of a having a fixed number of plays available per load of the virtual cartridges, the number of plays available are based on the denominations that are available for player selection and are dynamically updated during operation of the game plays based on the actual denominations used by the players in actual game play on the electronic game console as described more fully below. For example, if all games are played at a $0.25 level, the operator could get 200,000 plays per load. If all games are played at a $5.00 level, the operator could get 75,000 plays per load. Since each game will be played multiple times at each possible denomination, the number of games remaining at each denomination is determined dynamically after each play. Note that in the context of this invention, denomination of play and level of play are used interchangeably. Although the invention is described in terms of an exemplary embodiment, the scope of the claims are not limited to the exemplary embodiments disclosed.

Figure 2:
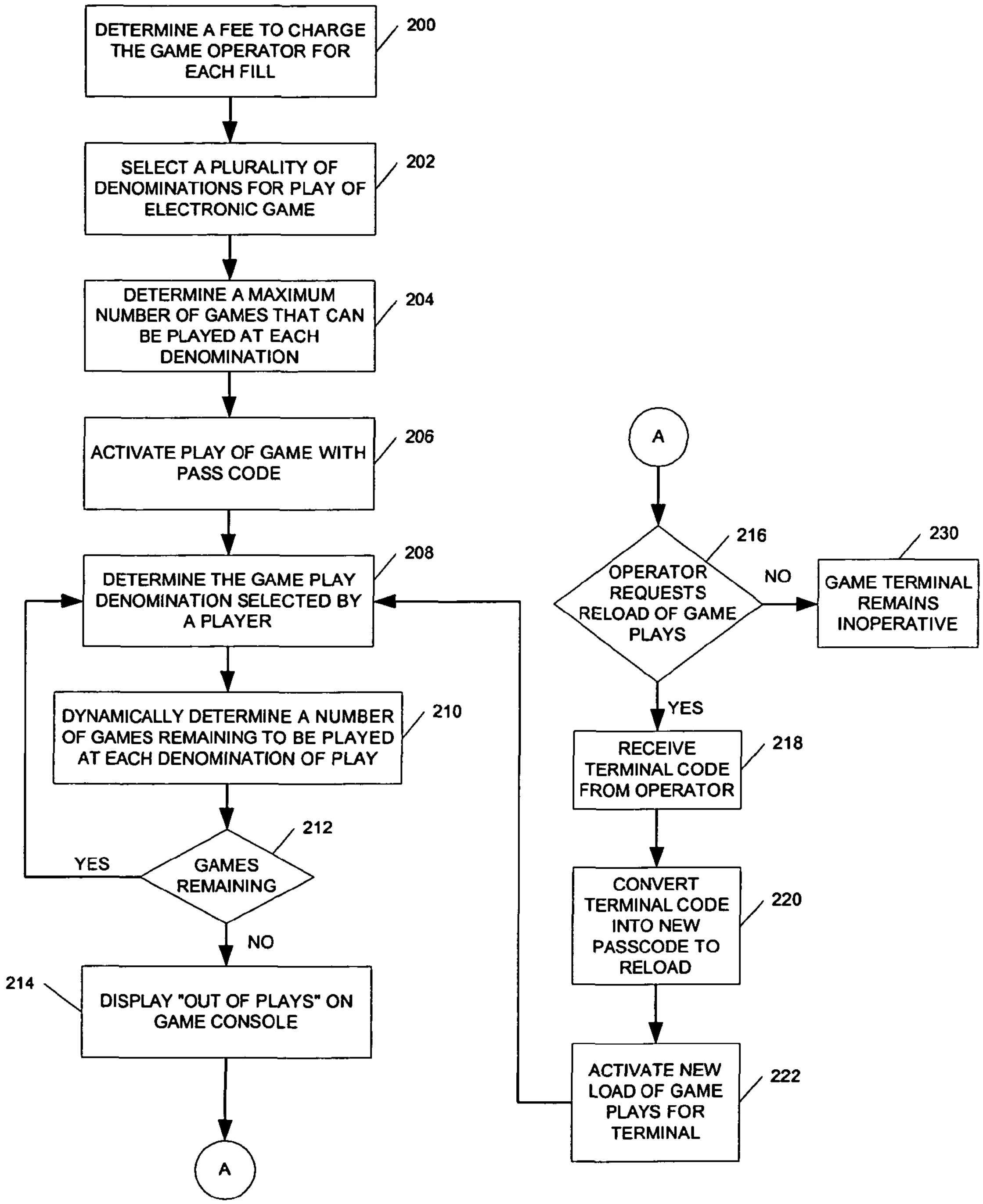
FIG. 2 illustrates processing logic for determining the remaining number of plays of an electronic game that are available at different denominations of play in an exemplary embodiment of the invention.

FIG. 2 illustrates processing logic for determining the remaining number of plays of an electronic game that are available at different denominations (i.e., levels) of play in an exemplary embodiment. The first few steps of the processing logic are performed before activation of the electronic game at the operator's venue with a "fill" or load of game plays. The electronic game service provider first determines the flat fee to be charged for the load of game plays as indicated in block 200. A plurality of denominations for play of the electronic game is selected as indicated in block 202. The denominations for an electronic game terminal can be preset by the electronic game service provider and changed by the operator. The electronic game service provider determines a maximum number of games that can be played at each of the plurality of denominations as indicated in block 204. This determination is made for each possible denomination of play although only four denominations are initially selected in the embodiment used for the Tic-Tac-Fruit game. The electronic game service provider provides a passcode that is generated from the terminal identifier to the operator. The operator then enters the passcode to activate game play as indicated in block 206. The electronic game software determines the denomination of play selected by the player in block 208. After each play of the game, the game software dynamically determines the number of games remaining to be played at each denomination of play as indicated in block 210. The number determined for each denomination of play reflects the number of games that could be played at the particular level of play.

After determining the number of plays remaining at each denomination, the game software determines if there are remaining games to be played as indicated in decision block 212. If there are games remaining to be played, the software returns to process block 208 for the next play of the game. If there are no games remaining to be played, the electronic game displays an "out of plays" message on the electronic game display as indicated in block 214. Next, in decision block 216, a determination is made as to whether the operator has requested a reload of game plays. Unless the operator requests a refill of the virtual game cartridge, the electronic game terminal remains inoperative as indicated in block 230. The operator requests a refill of game plays by sending the terminal identifier to the electronic game service provider in order to obtain a new passcode to reactivate the electronic game. The processing logic then returns to block 208 to wait for the next play of the electronic game.

Upon receiving the operator request for a refill of game plays (block 218), the electronic game service provider generates a new passcode for reloading the electronic game terminal that is based on the terminal identifier as indicated in block 220. The electronic game terminal is reactivated for play by entering the passcode into the terminal as indicated in block 222.

FIG. 3 illustrates an exemplary payout scheme for varying denominations of play in an exemplary embodiment. For the Tic-Tac-Fruit game used as an example herein, the electronic game service provider enables the operator to select four denominations for play. The first column 300 depicts the play denominations that can be selected. The second column 302 shows how much of the game play amount is returned to the player on average at each possible play denomination. The operator's profit per each game played at a particular denomination is shown in the third column 304 The total number of plays available at each denomination, if all game plays were made at a single denomination, is shown in the fourth column 306. As can be seen, the total number of plays available for each denomination per load varies non-linearly from 200K at the $0.25 level of play to 75K at the $3.00, $4.00 and $5.00 levels of play. The total number of games per load will vary based on actual denominations selected by the players. The electronic game service provider's profits at each denomination of play is shown in the fifth column 308. The percentage shown is expressed as a percentage of the operator's per game profit. For example, the electronic game service provider's profit per play at the $4.00 level of play is $0.0156 which is 6.5% of the operator's corresponding profit of $0.21 per play. It should be noticed that in this example, the game provider profit per play is variable and non-linear based on the different denominations. The next column 310 indicates the equivalent amount that the game provider would have to "charge per each play" at each denomination to reach the flat fee that is actually charged per load. In other words, the electronic game service provider charges a flat fee per load of the virtual cartridges. If all the games were played at a particular denomination, e.g. $1.00, the total number of games played allowed by the game software control would be 120K and the equivalent game provider charge per play at this level would be $0.00975. The last column indicates the operator's total profit per fill of the virtual cartridge if all games were played at the particular denomination. For example, if all games were played at the $0.25 level, the operator would make a total profit of $7500 taking into consideration the percentage amount returned to game players. If all games were played at the $5.00 level, the operator's profit per fill would be $18,750.00.

FIG. 4 illustrates game terminal status receipts available to the operator of electronic games in the "plays level" exemplary embodiment. In FIG. 4, the first column 400 labeled "CRD" represents multiples of the lowest denomination game play ($0.25 in this example). The second column 402 labeled "Value" indicates the denomination of play, ranging from $0.25 to $5.00. The third column 404 labeled "Count" represents the number of plays available at a particular denomination, if all games were played at the same level. The fourth column 406 labeled "Plays" indicates the number of games played at the corresponding levels in the "Value" column. In this sample terminal status receipt, two games have been played at the $0.50 level, one game at the $1.00 level and two games at the $4.00 level. The column total shows that eight games have been played on this game terminal. The next column 408 labeled "Rate-Use %" indicates the percentage of games that have been played at the corresponding play level. For example, 0.0067% of the available games at the $4.00 level per virtual cartridge load have been played. The final column 410 labeled "Left" indicates the remaining number of games available at a particular pay level as game play proceeds. The numbers in this column are determined dynamically after each game play. After the first eight game plays, there are 74,993 games remaining at the $3.00, $4.00 or $5.00 levels. The numbers in this column take into consideration each previous play of the electronic game and the denomination at which each game was played.

FIG. 5 illustrates game terminal status receipts available to the operator of electronic games in another exemplary embodiment. The game terminal status receipt illustrated in FIG. 5 is based on an electronic game concept referred to as the license timer. The use of this concept is particularly applicable to Class II games on Indian land. In this approach to controlling game play, the operator is provided with software that enables an electronic game terminal to be played for a fixed period of time, such as 30 days or 60 days. Typically, a number of electronic game terminals are networked together with one terminal being the server master and the other terminals being the client slaves. After the fixed period of time, the software license times out and the electronic game cannot be played any further except by receiving a new code to provide a reset of the electronic game timer mechanism. The master terminal generates a multi-digit code which must be provided to the electronic game service provider in order to receive a new code to activate terminal operation. The terminal-generated code contains encrypted information that indicates how much revenue each terminal is generating. The electronic game service provider charges a percentage of the revenue earned by each terminal for each fixed period of use of the electronic game. Depending on the denominations that are being played on each game terminal, the operator makes a variable amount of revenue, with the electronic game provider receiving a specified percentage of the operator's revenue for the period of time that the game is licensed. A problem with this basis for revenue is that the operators frequently under-report the revenue generated by the terminals during the license period.

The finite structure concept for the plays level invention described above has been combined with the license timer concept to increase the electronic game provider's revenue per license period. Instead of varying the number of plays available at each denomination, a charge is made per game played at each denomination level in a non-linear manner as exemplified in FIG. 5. The denominations of play are provided in column 502 labeled "Play Value." The next column 504 is labeled "Millicent Charge" and represents the variable amount charged by the electronic game service provider for each play value. For example, for a play level denomination of $2.00, the game terminal operator is charged $0.048 per play. The next column 506 is labeled "Bank Use Counter" and represents the number of plays at the corresponding play value. The total for this column is the total number of game plays on the terminal during the licensed period. The final column 508 labeled "Line Item Total" is simply the product of the previous two columns (i.e., "Millicent Charge" and "Bank Use Counter"). It represents the amount owed by the terminal operator to the electronic game service provider for the actual plays at a particular play value. The column total ($0.39) is the amount that the operator owes to the electronic game service provider for the 15 total plays at different play values. As game play progresses, the last two columns are continuously updated. When the software license expires after the license period, the operator must pay the amount identified as the total of the line item amounts in order to receive a code to activate the electronic game for another fixed period of time.

Figure 6:
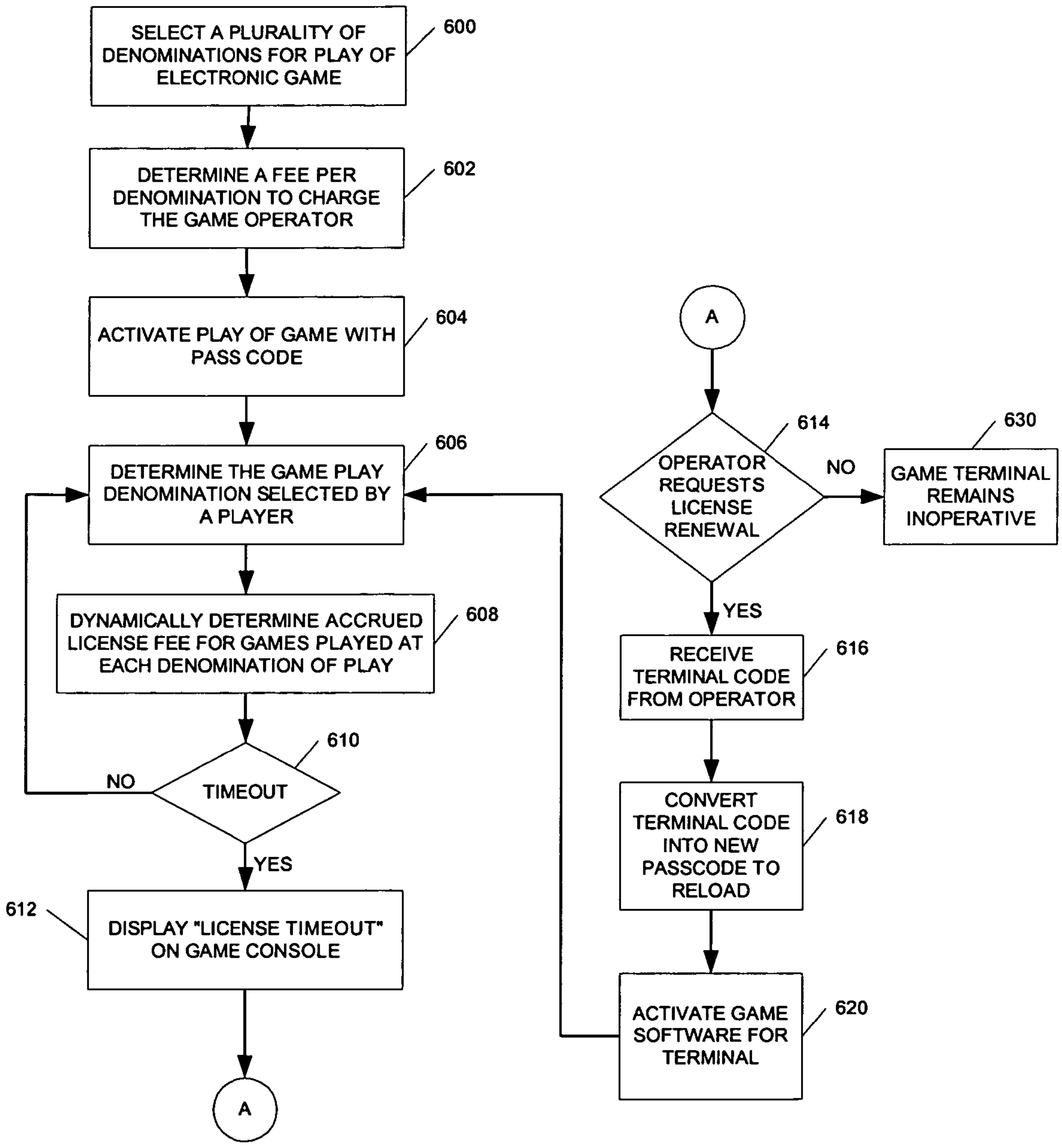
FIG. 6 illustrates the processing logic for determining the fees accrued by a game operator for plays of an electronic game in which the software license expires at the end of a predetermined time period in an exemplary embodiment.

FIG. 6 illustrates the processing logic for determining the fees accrued by a game operator for plays of an electronic game in which the software license expires at the end of a predetermined time period, such as 30 days or 60 days. This algorithm is particularly applicable to Class II games on Indian land. As indicated in logic block 600, the electronic game service provider selects a plurality of denominations for play of an electronic game. The denominations for an electronic game terminal can be preset by the electronic game service provider and changed by the operator. The electronic game service provider determines a fee per denomination of play to charge the game operator for each play as indicated in logic block 602. The electronic game service provider provides a passcode that is generated from the terminal identifier to the operator. The operator then enters the passcode to activate game play as indicated in block 604. The electronic game software determines the denomination of play selected by the player in block 606. After each play of the game, the game software dynamically determines the accrued license fee for the games played at each denomination of play as indicated in block 608.

After determining the accrued license fee for the games played at each denomination, the game software determines if the software license period has expired as indicated in decision block 610. If the software license has not expired, the software returns to process block 606 for the next play of the game. If the software license period has expired, the electronic game displays a "license timeout" message on the electronic game display as indicated in block 612. Next, in decision block 614, a determination is made as to whether the operator has requested a new software license period. Unless the operator requests a new software license period, the electronic game terminal remains inoperative as indicated in block 630. The operator requests a new software license period by sending the terminal identifier to the electronic game service provider in order to obtain a new passcode to reactivate the electronic game. The processing logic then returns to block 606 to wait for the next play of the electronic game.

Upon receiving the operator request for a new software license period (block 616), the electronic game service provider generates a new passcode for reactivating the electronic game terminal that is based on the terminal identifier as indicated in block 618. The electronic game terminal is reactivated for play by entering the passcode into the terminal as indicated in block 620.

Figure 7:
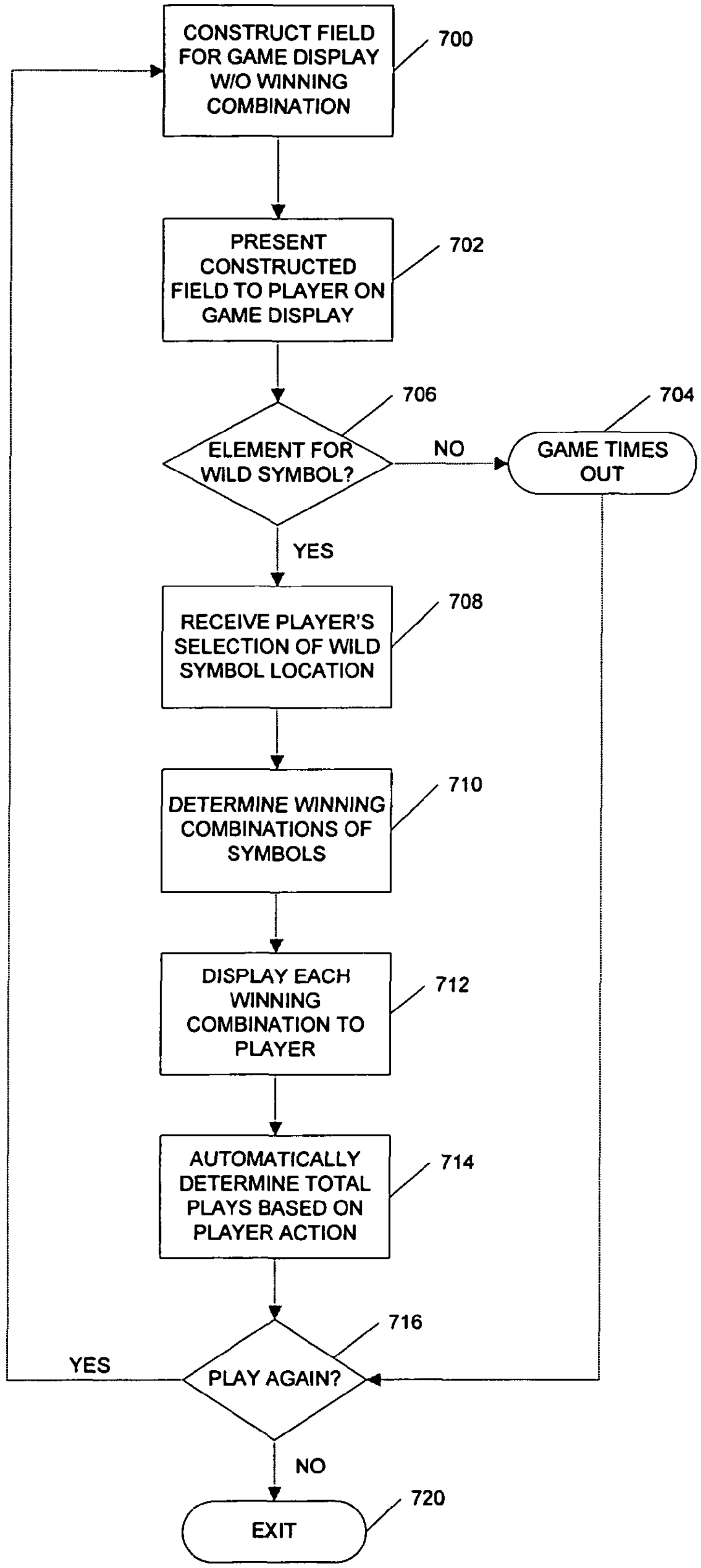
FIG. 7 illustrates the processing logic for controlling a total number of plays of an electronic game based on a player's action taken prior to selecting a displayed game field element to change to a wild symbol in an exemplary embodiment.

FIG. 7 illustrates the processing logic for controlling a total number of plays of an electronic game based on a player's action taken prior to selecting a displayed game field element to change to a wild symbol in an exemplary embodiment. Processing begins, as indicated in step 700, with the construction of a field of elements for a game display wherein each element is filled by a game symbol from the game symbols available. The underlying software algorithms follow several rules of game field construction before displaying the field to the player. These rules include selecting a number of winning combinations for a play of the game; selecting the orientation of each winning combination on the game grid; selecting the symbols for each winning combination; randomly selecting symbols for the remaining elements of the game grid; and testing the field for compliance with at least one of the preceding selections prior to presenting the field to the player. The displayed game field cannot contain a winning combination before play. The field is presented to the player in step 702.

One the constructed field is displayed to the player, the player has a finite time in which to make a decision regarding the element in the displayed field to select for the wild symbol. If the player fails to make a selection, the game times out (step 704). Otherwise, the player makes a selection of a wild symbol location in the displayed field in decision step 706. The game software receives and processes the player's selection of a wild symbol location in step 708. The game software determines the winning combinations of symbols in step 710, and displays the winning combinations to the player in step 712. The game software automatically determines the total number of plays of the game based on the player's action before commencing the game play in step 714. In an exemplary embodiment, such action can be the player's selection of a denomination of play. When the player selects a higher denomination of play, the number of remaining games available decreases at a faster rate than if a lower denomination of play is selected. Consequently, the total number of game plays are controlled by each such player action. In decision step 716, the player can opt to play again or end game play (step 720).

The present invention for controlling game plays of an electronic game have been described as a combination of hardware and software components. It is important to note, however, that those skilled in the art will appreciate that the software of the present invention is capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed is:

1. A method for controlling a total number of plays for a plurality of players of an electronic game, wherein the total number of plays is less than a predetermined maximum, comprising the steps of:

setting a maximum number of plays of the electronic game that can be played at each of a plurality of denominations of play;

constructing a field having a plurality of elements for a game display by an electronic game processor wherein each element is filled by a game symbol from a plurality of available game symbols wherein the game symbols for each element are automatically determined for each play of the game such that there is no winning combination without player interaction, wherein constructing the field includes:

selecting a number of winning combinations for a play of the game;

selecting an orientation of each winning combination for the play of the game;

selecting the symbols for each of the winning combinations;

randomly selecting symbols for the remaining elements of the field; and testing the field to ensure that a winning combination more valuable than the selected winning combinations is not generated inadvertently in completing the field;

presenting the field of game symbols to a player by the electronic game processor for selection of a field element wherein such player selection on the game display turns the symbol displayed in the field element into a wild symbol;

receiving the player's selection of the field element as a location for the wild symbol by the electronic game processor and determining each winning combination of symbols that is formed by such selection;

displaying each winning combination of symbols on the field of game symbols by the electronic game processor;

dynamically determining but not displaying a number of plays of the game remaining to be played by the plurality of players at each denomination of play by the electronic game processor based on an action taken by the player prior to selecting the field element location for the wild symbol, wherein determining the number of plays remaining at each denomination of play is a function of each previous play of the electronic game and the denomination at which each previous game was played; and disabling play of the electronic game for all players by the electronic game processor when the number of plays of the game remaining to be played by the plurality of players is depleted.

2. The method for controlling a total number of plays of an electronic game of claim 1 wherein the action taken by the player is a selection of a denomination of play from the plurality of denominations of play wherein the number of plays remaining at each denomination and the total number of plays available varies with the denomination selected.

3. The method for controlling a total number of plays of an electronic game of claim 2 wherein the denomination of play represents a level of play.

4. The method for controlling a total number of plays of an electronic game of claim 1 wherein the constructed field is an "n by n" array, with "n" designating the number of rows and columns of the array.

5. The method for controlling a total number of plays of an electronic game of claim 1 wherein the orientation of each winning combination is horizontal, vertical or diagonal.

6. The method for controlling a total number of plays of an electronic game of claim 1 wherein the plurality of game symbols are based on any one of a fruit theme, a pirate theme, a jewel theme and a sports theme.

7. The method for controlling a total number of plays of an electronic game of claim 1 wherein a less than optimum selection of a field element to turn into the wild symbol results in an amount that would have been won by an optimum selection of the wild symbol location being added to a bonus pool for a prize that can be won that is independent of any other award.

8. The method for controlling a total number of plays of an electronic game of claim 1 wherein each winning combination of symbols has an associated payout to the player.

9. The method for controlling a total number of plays of an electronic game of claim 1 wherein each winning combination of symbols has a predetermined probability of occurrence for a play of the game.

10. The method for controlling a total number of plays of an electronic game of claim 1 wherein one specific winning combination of symbols results in the award of a jackpot to the player.

11. A system for controlling a total number of plays for a plurality of players of an electronic game, wherein the total number of plays is less than a predetermined maximum, comprising:

a game processor for generating an electronic game display on a game terminal with a plurality of options selectable by a player, the game processor executing a plurality of components comprising:

a component for setting a maximum number of plays of the electronic game that can be played at each of a plurality of denominations of play;

a component for constructing a field having a plurality of elements for the game display wherein each element is filled by a game symbol from a plurality of available game symbols, wherein the game symbols for each element are automatically determined for each play of the game such that there is no winning combination without player interaction, the component for instructing including:

a module for selecting a number of winning combinations for a play of the game;

a module for selecting an orientation of each winning combination for the play of the game;

a module for selecting the symbols for each of the winning combinations;

a module for randomly selecting symbols for the remaining elements of the field; and a module for testing the field to ensure that a winning combination more valuable than the selected winning combinations is not generated inadvertently in completing the field;

a component for presenting the field of game symbols to the player for selection of a field element wherein such player selection on the game display turns the symbol displayed in the field element into a wild symbol;

a component for receiving the player's selection of the field element as a location for the wild symbol and determining each winning combination of symbols that is formed by such selection;

a component for displaying each winning combination of symbols on the field of game symbols;

a component for dynamically determining but not displaying a number of plays of the game remaining to be played by the plurality of players at each denomination of play based on an action taken by the player prior to selecting the field element location for the wild symbol, wherein determining the number of plays remaining at each denomination of play is a function of each previous play of the electronic game and the denomination at which each previous game was played; and a component for disabling play of the electronic game for all players when the number of plays of the game remaining to be played by the plurality of players is depleted.

12. The system for controlling a total number of plays of an electronic game of claim 11 wherein the action taken by the player is a selection of a denomination of play from the plurality of denominations of play wherein the number of plays remaining at each denomination and the total number of plays available varies with the denomination selected.

13. The system for controlling a total number of plays of an electronic game of claim 12 wherein the denomination of play represents a level of play.

14. The system for controlling a total number of plays of an electronic game of claim 11 wherein the field is constructed as an "n by n" array, with "n" designating the number of rows and columns of the array.

15. The system for controlling a total number of plays of an electronic game of claim 11 wherein the orientation of each winning combination is horizontal, vertical or diagonal.

16. The system for controlling a total number of plays of an electronic game of claim 11 wherein the plurality of game symbols are based on any one of a fruit theme, a pirate theme, a jewel theme and a sports theme.

17. The system for controlling a total number of plays of an electronic game of claim 11 wherein a less than optimum selection of a field element to turn into the wild symbol results in an amount that would have been won by an optimum selection of the wild symbol location being added to a bonus pool for a prize that can be won that is independent of any other award.

18. The system for controlling a total number of plays of an electronic game of claim 11 wherein each winning combination of symbols has an associated payout to the player.

19. The system for controlling a total number of plays of an electronic game of claim 11 wherein each winning combination of symbols has a predetermined probability of occurrence for a play of the game.

20. The system for controlling a total number of plays of an electronic game of claim 11 wherein one specific winning combination of symbols results in the award of a jackpot to the player.

21. A computer program product for controlling a total number of plays for a plurality of players of an electronic game when executed on an electronic game processor, wherein the total number of plays is less than a predetermined maximum, comprising a non-transitory computer readable medium having computer readable code embedded therein, wherein the computer readable code is executable by the electronic game processor to:

set a maximum number of plays of the electronic game that can be played at each of a plurality of denominations of play;

construct a field having a plurality of elements for an electronic game display wherein each element is filled by a game symbol from a plurality of available game symbols, wherein the game symbols for each element are automatically determined for each play of the game such that there is no winning combination without player interaction, wherein the computer readable code to construct the field includes computer readable code to:

select a number of winning combinations for a play of the game;

select an orientation of each winning combination for the play of the game;

select the symbols for each of the winning combinations;

randomly select symbols for the remaining elements of the field; and test the field to ensure that a winning combination more valuable than the selected winning combinations is not generated inadvertently in completing the field;

present the field of game symbols to a player for selection of a field element wherein such player selection on the game display turns the symbol displayed in the field element into a wild symbol;

receive the player's selection of the field element as a location for the wild symbol and determine each winning combination of symbols that is formed by such selection;

display each winning combination of symbols on the field of game symbols; and dynamically determine but not display an available number of plays of the game remaining for the plurality of players at each denomination of play based on an action taken by the player prior to selecting the field element location for the wild symbol, wherein the number of plays remaining at each denomination of play is a function of each previous play of the electronic game and the denomination at which each previous game was played; and disable play of the electronic game when the number of plays of the game remaining to be played by the plurality of players is depleted.

22. The computer program product for controlling a total number of plays of an electronic game of claim 21 wherein the action taken by the player is a selection of a denomination of play from the plurality of denominations of play wherein the number of plays remaining at each denomination and the total number of plays available varies with the denomination selected.

23. The computer program product for controlling a total number of plays of an electronic game of claim 22 wherein the denomination of play represents a level of play.

24. The computer program product for controlling a total number of plays of an electronic game of claim 21 wherein the field is constructed as an "n by n" array, with "n" designating the number of rows and columns of the array.

25. The computer program product for controlling a total number of plays of an electronic game of claim 21 wherein the orientation of each winning combination is horizontal, vertical or diagonal.

26. The computer program product for controlling a total number of plays of an electronic game of claim 21 wherein the plurality of game symbols are based on any one of a fruit theme, a pirate theme, a jewel theme and a sports theme.

27. The computer program product for controlling a total number of plays of an electronic game of claim 21 wherein a less than optimum selection of a field element to turn into the wild symbol results in an amount that would have been won by an optimum selection of the wild symbol location being added to a bonus pool for a prize that can be won that is independent of any other award.

28. The computer program product for controlling a total number of plays of an electronic game of claim 21 wherein each winning combination of symbols has an associated payout to the player.

29. The computer program product for controlling a total number of plays of an electronic game of claim 2 wherein each winning combination of symbols has a predetermined probability of occurrence for a play of the game.

30. The computer program product for controlling a total number of plays of an electronic game of claim 21 wherein one specific winning combination of symbols results in the award of a jackpot to the player.

* * * * *